US009361533B2

(12) United States Patent
Serrels et al.

(10) Patent No.: US 9,361,533 B2
(45) Date of Patent: Jun. 7, 2016

(54) APPARATUS AND METHOD FOR POLARIZATION DIVERSITY IMAGING AND ALIGNMENT

(71) Applicant: DCG Systems, Inc., Fremont, CA (US)

(72) Inventors: Keith Serrels, Fremont, CA (US); Prasad Sabbineni, San Ramon, CA (US); James S. Vickers, San Jose, CA (US)

(73) Assignee: DCG SYSTEMS, INC., Fremont, CA (US)

( * ) Notice: Subject to any disclaimer, the term of this patent is extended or adjusted under 35 U.S.C. 154(b) by 166 days.

(21) Appl. No.: 13/679,938

(22) Filed: Nov. 16, 2012

(65) Prior Publication Data
US 2013/0121617 A1 May 16, 2013

Related U.S. Application Data

(60) Provisional application No. 61/560,750, filed on Nov. 16, 2011.

(51) Int. Cl.
| | |
|---|---|
| *G06K 9/36* | (2006.01) |
| *G06K 9/32* | (2006.01) |
| *G02B 21/00* | (2006.01) |
| *G02B 27/58* | (2006.01) |

(52) U.S. Cl.
CPC ............ *G06K 9/3233* (2013.01); *G02B 21/002* (2013.01); *G02B 21/0092* (2013.01); *G02B 27/58* (2013.01)

(58) Field of Classification Search
CPC ............... G06T 2207/30148; G06T 7/0004; G06T 2207/10152; G06T 2207/30141; G06T 17/5068
See application file for complete search history.

(56) References Cited

U.S. PATENT DOCUMENTS

| | | | |
|---|---|---|---|
| 5,506,793 A * | 4/1996 | Straayer et al. | 702/85 |
| 6,252,222 B1 | 6/2001 | Kasapi et al. | |
| 6,848,087 B2 | 1/2005 | Sengupta et al. | |
| 7,149,342 B2 | 12/2006 | Biazik et al. | |
| 7,616,312 B2 | 11/2009 | Kasapi et al. | |

(Continued)

FOREIGN PATENT DOCUMENTS

| | | |
|---|---|---|
| EP | 2780697 A1 | 9/2014 |
| JP | 2000-111484 A | 4/2000 |
| JP | 2015-500505 A | 1/2015 |
| KR | 10-2014-0108529 A | 9/2014 |
| TW | 1500924 B | 9/2015 |
| WO | 2013/075038 A1 | 5/2013 |

OTHER PUBLICATIONS

First Office Action and Search Report in Taiwan Patent Application No. 101142828 dated Oct. 2, 2014.

(Continued)

*Primary Examiner* — Stephen R Koziol
*Assistant Examiner* — Jonathan S Lee
(74) *Attorney, Agent, or Firm* — Nixon Peabody LLP; Joseph Bach, Esq.

(57) ABSTRACT

A method of obtaining two orthogonally polarized super-resolution images is provided. A first diffraction-limited image is obtained using horizontally polarized light; a second diffraction-limited image is obtained using vertically polarized light; and, the first and second images are processed so as to yield a convoluted image having super diffraction-limited performance in both dimensions. Enhanced alignment of CAD image to acquired image is facilitated using the horizontally and vertically polarized images.

20 Claims, 5 Drawing Sheets

(56) References Cited

U.S. PATENT DOCUMENTS

| | | | |
|---|---|---|---|
| 7,659,981 B2 | 2/2010 | Lo et al. | |
| 7,697,746 B2* | 4/2010 | Kawaguchi | 382/149 |
| 8,687,192 B2 | 4/2014 | Niu et al. | |
| 8,749,784 B1 | 6/2014 | Shen et al. | |
| 2006/0239535 A1* | 10/2006 | Takada et al. | 382/145 |
| 2007/0046947 A1* | 3/2007 | Lo et al. | 356/492 |
| 2007/0057184 A1* | 3/2007 | Uto et al. | 250/310 |
| 2008/0144919 A1* | 6/2008 | Yedur et al. | 382/144 |
| 2009/0166517 A1* | 7/2009 | Moribe et al. | 250/225 |
| 2009/0290783 A1* | 11/2009 | Sakai et al. | 382/149 |
| 2009/0294981 A1* | 12/2009 | Smayling et al. | 257/773 |
| 2010/0182459 A1* | 7/2010 | Hwang et al. | 348/240.99 |
| 2010/0182602 A1* | 7/2010 | Urano et al. | 356/369 |
| 2010/0321680 A1* | 12/2010 | Takada | 356/237.5 |
| 2011/0026806 A1* | 2/2011 | Bernstein et al. | 382/145 |
| 2013/0121617 A1 | 5/2013 | Serrels et al. | |

OTHER PUBLICATIONS

International Search Report in International Patent Application No. PCT/US2012/065695, mailed Feb. 6, 2013.

International Preliminary Report on Patentability in International Patent Application No. PCT/US2012/065695, mailed May 30, 2014.

Written Opinion in Singapore Patent Application No. 11201402336T, mailed Mar. 11, 2015.

Ippolito, S.B. et al., "High spatial resolution subsurface microscopy", Applied Physics Letters, vol. 78, Issue 26, Jun. 25, 2001, pp. 4071-4073.

Ippolito, S.B. et al., "Theoretical analysis of numerical aperture increasing lens microscopy", Journal of Applied Physics, vol. 97, pp. 053105-1 to 053105-12 (Published online Feb. 11, 2005).

Serrels, K.A. et al., "Solid immersion lens applications for nanophotonic devices", Journal of Nanophotonics, vol. 2, 021854, Dec. 19, 2008, pp. 1-29.

Serrels, K.A. et al., "Nanoscale optical microscopy in the vectorial focusing regime", Nature Photonics 2, pp. 311-314 (Published online Mar. 9, 2008).

Serrels, K.A. et al., "70 nm resolution in subsurface optical imaging of silicon integrated-circuits using pupil-function engineering", 2009, Applied Physics Letters, vol. 94, Issue 7, pp. 073113-1 to 073113-3 (Published online Feb. 18, 2009).

Written Opinion in Singapore Patent Application No. 112014023361 dated Oct. 21, 2015.

Notice of Intention to Refuse Patent Application with Examination Report for Singapore Patent Application No. 112014023361T dated Apr. 8, 2016.

* cited by examiner

APPARATUS AND METHOD FOR POLARIZATION DIVERSITY IMAGING AND ALIGNMENT

RELATED APPLICATIONS

This Application claims priority benefit from U.S. Provisional Application Ser. No. 61/560,750, filed on Nov. 16, 2011, the disclosure of which is incorporated herein by reference in its entirety.

This invention was made with government support under contracts FA8650-11-C7104 and FA8650-11-C7105 awarded by The Intelligence Advanced Research Projects Activity (IARPA). The government has certain rights in the invention.

BACKGROUND

1. Field

This disclosure relates to super-resolution optical microscopy, especially beneficial for identification and alignment of structures fabricated in semiconductor materials.

2. Related Art

Limited optical resolution and poor CAD overlay accuracy is presently limiting post fabrication characterization, design debug, and failure analysis, as well as monitoring of yield issues before completing fabrication.

During design and verification stage of semiconductor devices, it is important to test for various defects or problematic areas of the chip design that may lead to defects. However, in order to do that, many times the device is probed or observed using an optical systems and/or microscopes. Also, in order to identify the structures being imaged, the image is aligned to a CAD design of the circuit. Typically, this step includes aligning corresponding features of two different images of the IC under test. The first image can be an acquired image of the actual circuit. The second image can be derived from a computer-aided design ("CAD") image that lays out the complicated map of circuit elements. In general, a CAD image is ideal representation of the IC and typically is generated using a CAD system. Under such conditions, it is important to be able to optically resolve various features in the image of the actual IC, such that the features can be aligned to the CAD image.

Figures 1A, 1B:
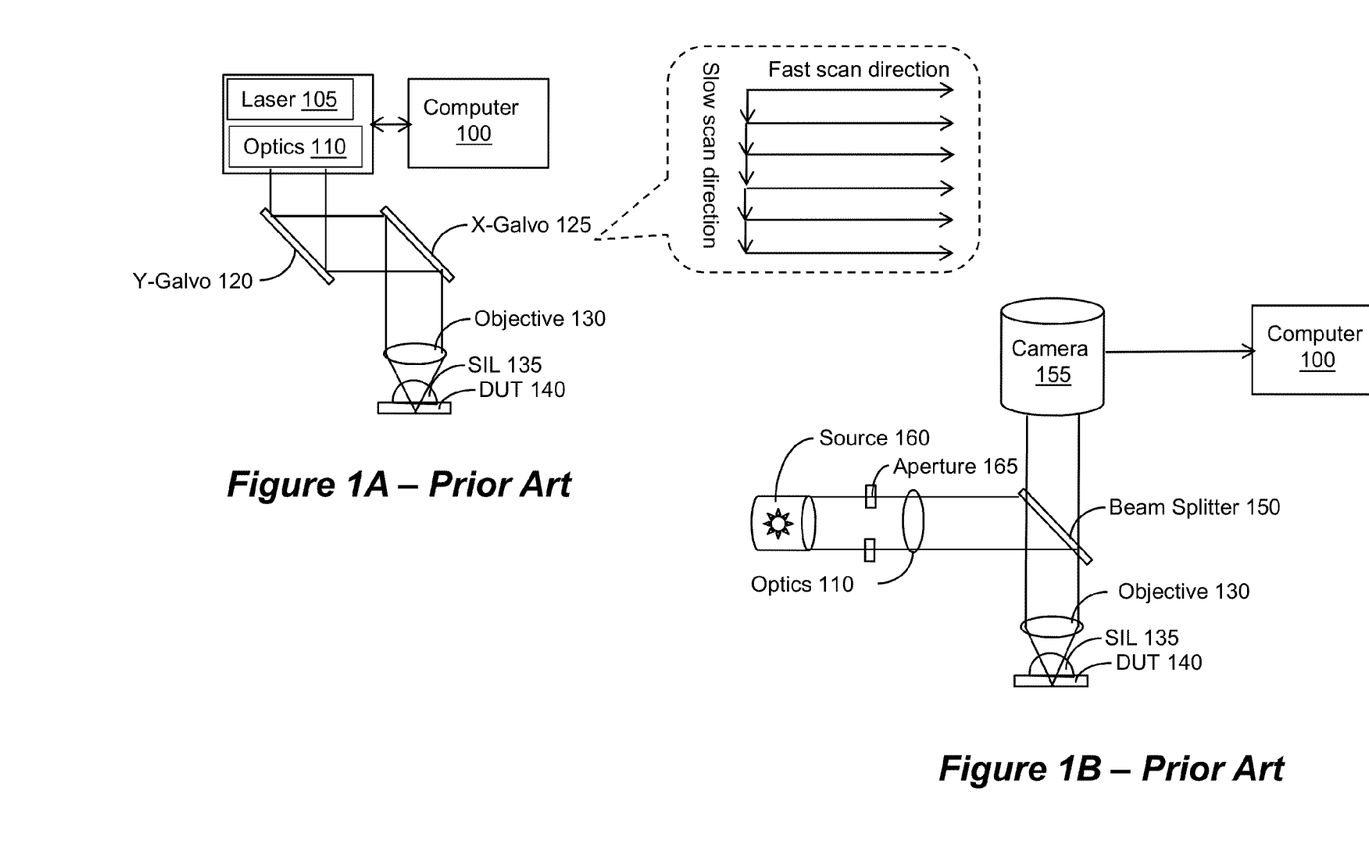
FIGS. 1A and 1B illustrate imaging system configurations according to the prior art.

FIGS. 1A and 1B illustrate a conventional diffraction-limited reflection-based imaging system for ICs. The example illustrated in FIG. 1A utilizes a computer system 100, which controls and receives signals from an illumination source, shown as a continuous-wave laser source (e.g., 1064 nm). The light from the illumination source 105 passes through beam shaping optics 110 and scanning elements, e.g., Y-galvanometer controlled mirror 120 and X-galvanometer controlled mirror 125, together forming a confocal laser scanning microscope (LSM). The Y-mirror and X-mirror scan the beam in a slow scan direction and a fast scan direction, respectively, as illustrated in the callout. The bean then passes through a high numerical aperture objective lens 130 and a solid immersion lens 135, to be scanned on an area of interest in the specimen, e.g., an IC circuit generally referred to as device under testing (DUT) 140.

FIG. 1B illustrates another example which uses a light source 160, which may be, for example, LED, super luminescent diode (SLED or SLD), laser, etc. Its light beam is passed through aperture 165 and beam shaping optics 110. Beam splitter 150 directs the beam towards DUT 140, via objective lens 130 and SIL 135. Light reflected from the DUT 140 is collected by the SIL 135 and passes objective 130 and beam splitter 130, to be collected by camera 155. The signal of the camera is sent to the computer 100.

The above examples enable optimized navigation, visual characterization and CAD overlay of structures of interest located generally between 10-100 microns, and sometimes even up to 780 microns, below the IC's silicon substrate, depending on substrate doping and sample preparation. Although these approaches operate with a high level of performance control, they are ultimately limited as they cannot address the demands faced by the latest fabrication process nodes. More specifically, they lack the optical resolution required to achieve both accurate structural definition and recognition in order to fulfill the duties outlined above. This therefore requires a novel imaging system in order to match these developments.

For further information the reader is directed to: S. B. Ippolito, B. B. Goldberg, and M. S. Unlu, "High spatial resolution subsurface microscopy", Applied Physics Letters 78, 4071-4073 (2001); S. B. Ippolito, B. B. Goldberg, and M. S. Unlu, "Theoretical analysis of numerical aperture increasing lens microscopy", Journal of Applied Physics 97, 053105 (2005); K. A. Serrels, E. Ramsay, P. A. Dalgarno, B. D. Gerardot, J. A. O'Connor, R. H. Hadfield, R. J. Warburton, and D. T. Reid, "Solid immersion lens applications for nano-photonic devices", Journal of Nanophotonics 2, 021854 (2008); K. A. Serrels, E. Ramsay, R. J. Warburton, and D. T. Reid, "Nanoscale optical microscopy in the vectorial focusing regime", Nature Photonics 2, 311-314 (2008); K. A. Serrels, E. Ramsay, D. T. Reid, "70 nm resolution in subsurface optical imaging of silicon integrated-circuits using pupil-function engineering", Applied Physics Letters 94, 073113 (2009); D. A. Pucknell and K. Eshraghian, Basic VLSI Design, 3rd edition, Prentice Hall (1994); and U.S. Pat. Nos. 7,659,981; 7,616,312; 6,848,087; and 6,252,222.

SUMMARY

The following summary is included in order to provide a basic understanding of some aspects and features of the disclosure. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to disclosed aspects, vectorial tailoring of the electric-field of a focused illumination (e.g., laser) beam is employed in order to surpass the conventional diffraction-limit imaging. Linear polarization is used to image the article with the polarization aligned to elements in the article positioned in one orientation, while a complementary polarization is used to image the article with the complementary polarization aligned with articles positioned in complementary orientation. The resulting images may be convoluted to generate a single enhanced image, or used separately.

Various disclosed embodiments are particularly relevant to imaging of IC's. Such embodiments enable improved computer aided design (CAD) overlay and alignment within silicon integrated-circuits (IC). Alignment of a CAD design of the IC to the actual image of the IC enables navigation and test and debug of the IC.

Embodiments disclosed herein may utilize a continuous-wave 1064 nm laser source, along with the resolution-enhancing techniques of polarization-sensitive imaging and pupil-function engineering, in a confocal reflection or InGaAs/MCT camera imaging arrangement in order to facilitate linearly-induced super-resolved optical interrogation and CAD alignment for integrated-circuit inspection and analysis.

According to aspects of the invention, a system and method for imaging structures fabricated within an IC are provided. The IC is imaged twice with two polarized light beams, one horizontally polarized and one is vertically polarized. The images are then combined to form one high-resolution image. The images may be taken sequentially or concurrently. The light beam may be from a laser, SLED, LED, etc. The imaging sensor (camera) may be InGaAs, MCT, CCD, InSb, CMOS GaAs, InP etc. An annular aperture may be used in the beam's optical axis.

Disclosed embodiments include methods of obtaining super-resolution image, comprising: obtaining a first diffraction-limited image of a device using horizontally polarized light; obtaining a second diffraction-limited image of the device using vertically polarized light; and, processing the first and second images so as to yield a convoluted image having super diffraction-limited performance in both dimensions. The method may further comprise using device CAD data to identify structures that run predominantly in either the horizontal or the vertical direction; taking image "H" using horizontally polarized light, to compare with horizontal CAD features; taking image "V" using vertically polarized light, to compare with vertical CAD features; and, optimally using the data to improve the precision of the image-to-CAD overlay process. The method may further comprise weighting the polarization contributions to optimize the resulting alignment.

According to further embodiments, a method for obtaining a high resolution image is provided, comprising: acquire two separate super-resolved images, wherein a first mage has high spatial content parallel to the scan direction and a second image has high spatial content in the direction orthogonal to the first; and, post-processing the first and second images data to generate a super-resolved two-dimensional image of a given region of interest. The first and second images may be obtained successively and the polarization may be rotated through 90 degrees for subsequent acquisitions, but the scan direction remains fixed. Alternatively, the first and second images are obtained simultaneously. The method may further comprise multiplexing the high resolution content from the first and second images into one combined image. The multiplexing may be obtained by extracting the high frequency components of both the first and second images and combing them in to a single image. The first and second images may be obtained by: splitting a laser beam into a first and second beamlets in two separate pathways; pre-polarizing the electric-field vectors of the two beamlets to be mutually orthogonal to each other; modulating the laser beamlets using same repetition rate conditioning; and re-combining the two beamlets collinearly along an optical axis where one polarization state is intentionally delayed by half a repetition-rate cycle in order for them to strike the sample at the same rate but at different times. The pre-polarizing may be done using half-wave plates in each path. The step of processing may comprise computing, pixel by pixel, by summing the curvature of the first image the curvature of the second image, where curvature is defined as the discrete second derivative of the data. The step of processing may comprise convolving the first image with the horizontal Kernel $\{-1, +2, -1\}$, and added to the second image convolved with the vertical Kernel $\{-1, +2, -1\}^T$; wherein superscript T denotes the matrix transpose operator. One of the first and second diffraction-limited images may comprise a horizontally polarized image and one of the first and second diffraction-limited images may com-
prises a vertically polarized image, and the method may further comprise: weighting the horizontally polarized image more heavily in regions where the diffusion runs horizontally, and weighting the vertically polarized image more heavily in regions where the diffusion runs vertically. A mask may be used to image a selected area of the device. The mask may comprise a phase transmission mask or a binary mask.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify various embodiments and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements and are, therefore, not drawn to scale.

DETAILED DESCRIPTION

Embodiments of this invention enable enhanced optical imaging of features within a sample. As will be apparent from the proceeding description, disclosed embodiments are particularly advantageous for imaging samples having features in an orthogonal alignment, sometimes referred to as Manhattan structures, due to streets and avenues being orthogonally aligned with each other. Integrated circuits are generally fabricated with features that are orthogonally aligned to each other and, therefore, disclosed embodiments are particularly useful for high resolution imaging of features fabricated within IC's.

According to various embodiments, various optical arrangements and system architectures are disclosed for obtaining high resolution imaging. Additionally operational procedures and methods to obtain super-resolved two-dimensional optical and CAD alignment images of integrated-circuit are provided. A combined super-resolved image can be obtained by multiplexing the high spatial contents from two separate reflection-based images, whose high resolution vectors are mutually orthogonal, into one unified image. These processes are introduced and various embodiment of system that can be employed with these processes are discussed below.

Figure 2A:
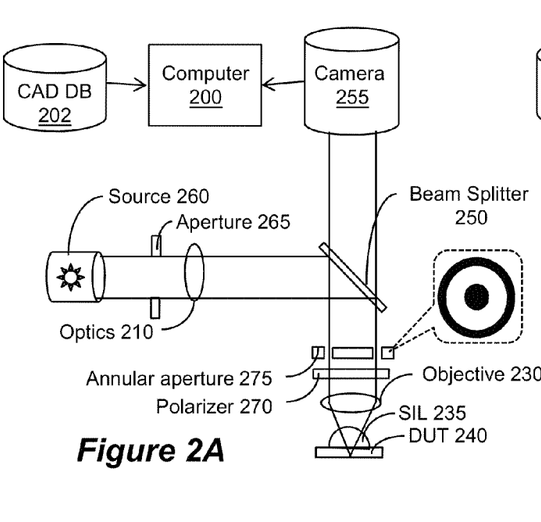
FIGS. 2A and 2B are embodiments of super-resolution camera imaging system.

An optical arrangement according to one embodiment for obtaining high resolution images is illustrated in FIG. 2A. A light source 260 provides a beam of light that passes through aperture 265 and beam optics 210 and is directed towards DUT 240 by beam splitter 250. The light reflected from DUT 240 is collected by SIL 235 and objective 230. The collected reflection passes beam splitter 250 and is sensed by camera 255. The signal of the camera is sent to the computer 200. In this embodiment two elements are of interest as contributing to enhanced resolution. First, a linear polarizer 270 is positioned before the objective 230 to control the polarization direction of the illumination beam and captured image. By controlling the polarization direction of linear polarizer 270, one can obtain super-resolved imaging performance in one dimension, i.e., the direction that is aligned with the direction of linear polarizer 270. The polarizer can then be rotated to obtain a second image of super-resolution in the orthogonal direction. Second, a binary amplitude annular aperture 275 excludes any low-NA paraxial rays from contributing towards the resulting image, and thus enables a further enhancement of the system's imaging capabilities. As shown in the callout, the annular aperture blocks light rays in the center of the beam, and the amount of blockage can be selected by enlarging or reducing the diameter of the center blocking mask.

Figure 2B:
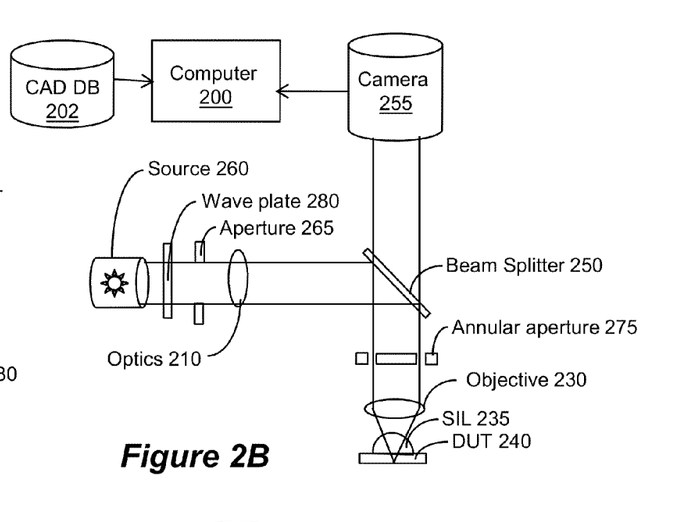

In the embodiment of FIG. 2A the linear polarizer was provided on the path of the illumination and reflected light. However, the linear polarizer may also be provided on the illumination path only. One such example is illustrated in FIG. 2B. In the embodiment of FIG. 2B, a light beam from source 260, e.g., LED, SLED or Laser, passes through a switchable half wave plate 280. Alternatively one can use a variable wave plate. By switching the half wave plate 280 into the path of the light beam one can rotate the polarization by 90 degrees, so as to align the polarization with elements to be imaged. Two images can be obtained having super-resolution at orthogonal directions.

The images obtained using the systems of FIGS. 2A and 2B can be used to assist in aligning the imaged circuit to the CAD image, which is stored in CAD database 202. For example, the image having enhanced horizontal resolution can be aligned to vertical structures in the CAD image of the same region, while the image having enhanced vertical resolution can be aligned to horizontal structures in the CAD image of the same region. This results in enhanced image-to-CAD alignment of the imaged region of the microchip.

Figure 3:
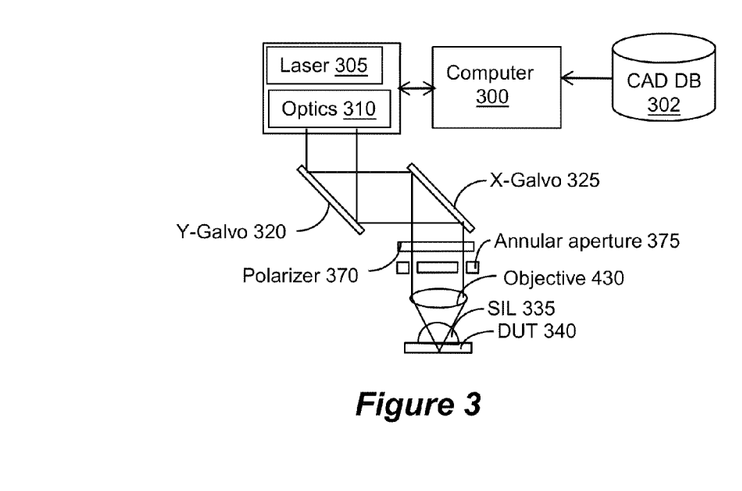
FIG. 3 illustrates an embodiment of a super-resolution confocal reflection LSM configuration.

FIG. 3 illustrates another example, wherein a beam is scanned over the area to be imaged. The embodiment of FIG. 3 utilizes a laser source 305 and optics 310 to form a laser beam, which is scanned using mirrors 320 and 325, thereby forming a laser scanning microscope (LSM). To increase the resolution in one linear direction, a half-wave plate 370 is positioned before the objective lens, to control the polarization direction of the incident laser beam. The polarizer 370 can be rotated to generate two images with orthogonal polarization, one having enhanced horizontal resolution and one having enhanced vertical resolution. As explained with respect to the embodiments of FIGS. 2A and 2B, the image having enhanced horizontal resolution can be aligned to vertical structures in the CAD image of the same region, while the image having enhanced vertical resolution can be aligned to horizontal structures in the CAD image of the same region.

As in prior embodiments, annular aperture 375 excludes any low-NA paraxial rays from contributing towards the resulting image, and thus enables a further enhancement of the system's imaging capabilities.

Figure 4:
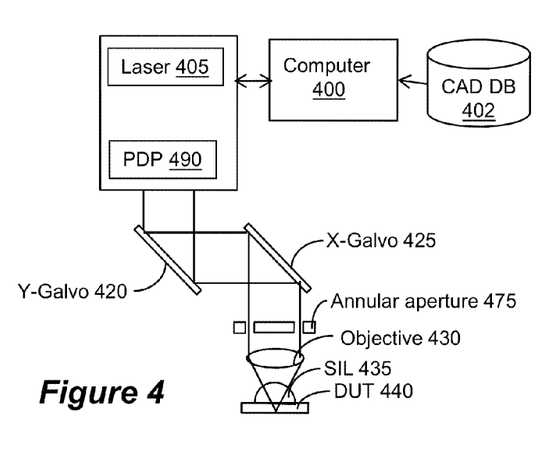
FIG. 4 illustrates an embodiment of an alternate method for super-resolution confocal reflection LSM configuration using PDP optics.

The systems described above image the specimen in one linear direction at a time. However, other arrangement can be devised for obtaining images at two orthogonally aligned linear polarizations. On such example is illustrated in FIG. 4. In the embodiment of FIG. 4, the beam from laser 405 is passed through PDP optics 490 and is scanned by LSM (i.e., mirrors 420 and 425). The scanned beam is passed through annular aperture 475 prior to being scanned on the DUT 440. The PDP detection scheme enables the system to capture horizontal and vertical polarizations images simultaneously.

Figure 5A:
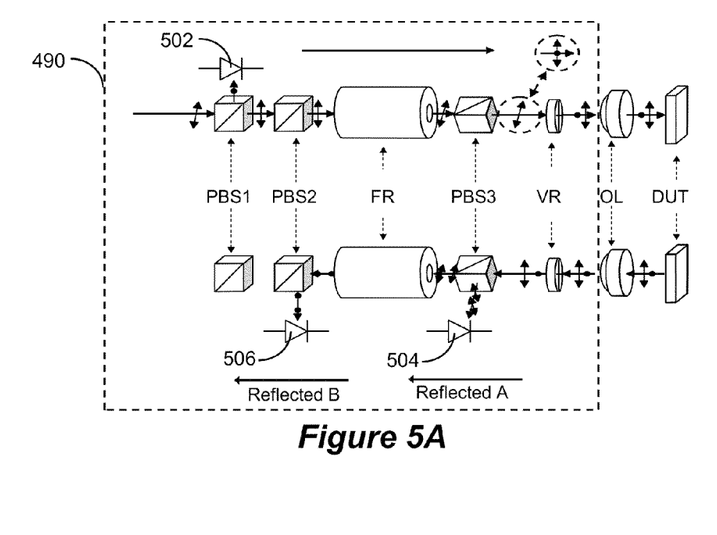
FIG. 5A illustrates an embodiment of PDP optics, while FIG. 5B illustrate an embodiment which can serve as an alternative to PDP optics.

The PDP optics is disclosed in, among others, U.S. Pat. No. 7,733,100, which is incorporated herein by reference. A standard PDP optics is illustrated in FIG. 5A, wherein the broken-line rectangle encompasses the elements that would be incorporated into PDP 490 of FIG. 4. While in actuality the incident beam and the reflected beam follow a single path and traverse the same elements, for better understanding the illustration of FIG. 5A is divided into two optical paths, showing each optical element twice. The top path is the incident beam path originating from the laser source, while the bottom path is the reflected beam path. The incident beam travels from left to right in the illustration. Along the beam path, vertically oriented arrows indicate a vertically polarized beam while dots indicate a horizontally polarized beam. A tilted arrow indicates a beam that is linearly polarized at some angle off the vertical. Spatial separation between a dot and an arrow depicts a phase difference between the two beams.

The beam from the laser source enters the first polarizing beam splitter PBS1 so that part of the beam is deflected towards light sensor 502. This deflection may be set at 5% or so. The output of the sensor 502 is used to monitor the beam's intensity and is not part of the PDP optics, but is rather an optional intensity monitor. The remaining part of the beam that passes through the first PBS cube (PBS1) enters the second polarizing beam splitters PBS2, which is oriented to pass only a vertically oriented beam. The beam's polarization state is rotated a predetermined amount so as to generate a rotated polarized beam that is an equivalent of a superposition of a vertically polarized beam and a horizontally polarized beam. In this example, the beam is rotated 45 degrees from the vertical by the action of the Faraday rotator (FR) and the third PBS cube (PBS3) is oriented to transmit the rotated beam. Consequently, at this stage the beam is the equivalent of a superposition of a vertically polarized beam and a horizontally polarized beam, both beams equal in amplitude and in phase with each other. If the amplitude of the beam should not be set to equal, the rotation should be to a different angle. The dashed callout circles in the incident beam path, between PBS3 and VR, indicate the equivalence between a 45-degree polarized beam and two in-phase, equal amplitude beams, one polarized vertically and the other horizontally. As can be understood, for certain application the rotation may be to other than 45 degrees, in which case the equivalence would be of two, in-phase beams, one polarized vertically and the other horizontally, but having different amplitude.

The two beams then enter the variable retarder VR. The fast and slow axes of the variable-retarder (VR) are aligned along these vertical and horizontal polarization directions. Thus, after passage through the VR, the beam consists of two spatially coincident, equal-amplitude, orthogonally polarized beams that are phase-shifted (retarded) with respect to each other by a small amount (nominally, $\pi/4$). This is indicated in the illustration by the dot being slightly behind the vertical arrow, representing a retardation of the horizontally polarized beam relative to the vertically polarized beam. The two beams are then focused onto the same point on the DUT by the objective lens OL. The DUT is oriented such that the polarization directions of these two beams are aligned with the length and width directions of the transistor gates.

After the beams are reflected by the DUT (FIG. 5A, bottom path) the two linearly polarized beams retrace their path to the VR. Passing through the VR introduces an addition phase-shift between the two returned reference and probing beams (now nominally phase-shifted by $\pi/2$). At PBS3, a portion of each beam is reflected and sent to photosensor 504, and the other portion is transmitted. The reflected portions generate the reflected-A signal, which is collected by photosensor 504, and its output is collected by the receiver electronics and analyzed. The transmitted portions are deflected out of the beam path via the action of the Faraday rotator FR and the beam splitter PBS2 so as to generate the reflected-B signal, which is detected by a second photosensor 506. Using this embodiment, the reflected-A signal can be used to align the image to region of the CAD design having elements oriented in one direction, while reflected-B signal can be used to align the image to region of the CAD design having elements oriented in a direction orthogonal to the direction of elements in the first region.

Figure 5B:
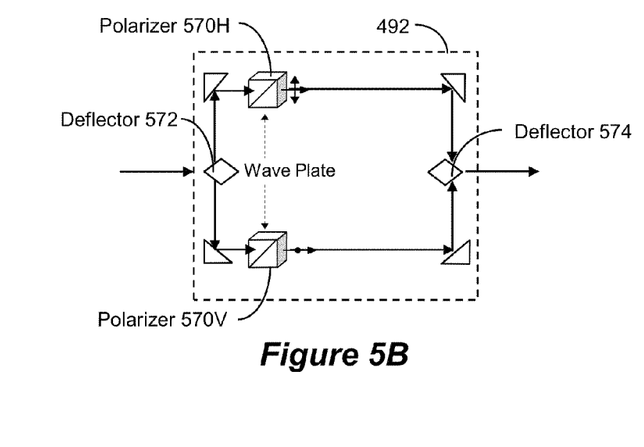

Other designs can be used to obtain two orthogonally polarized images, without the use of PDP optics. One example is illustrated in FIG. 5B, wherein the PDP optics 490 of FIG. 4 is replaced with the selective polarizer enclosed by broken-line rectangle 492, of FIG. 5B. The laser beam enters the selective polarizer from the left side of rectangle 492 and is alternatingly deflected by deflector 572 towards the upper optical path or the lower optical path. Deflector 572 may be an actuated mirror, a rotating mirror, an acoustic-optical deflector (AOD), etc. The deflector may be actuated to alternatingly deflect the beam to each path at a given frequency, such that at any given period the beam will be traversing either the upper or lower optical paths. For example, when using a pulsed laser, the deflector may be actuated to alternatingly deflect each pulse or every group of pulses.

At the upper path, the beam is passed through a horizontal polarizer 570H, while at the lower path the beam traverses a vertical polarizer 570V. The beam is then deflected by deflector 574, such that it continues on the same optical path towards the scanner (e.g., LSM mirrors 420 and 425) regardless whether it has traversed the upper or lower optical path. Consequently, at each subsequent period the beam arriving at the scanner would be alternatingly horizontally or vertically polarized. For example, when pulsed laser is used, each pulse or each group of pulses would be alternatingly horizontally or vertically polarized. By properly tailoring the period of the deflector 572, the speed of the fast scanning direction of the scanner, and the sampling frequency, one can obtain two orthogonally polarized images of the area of interest.

Figure 6:
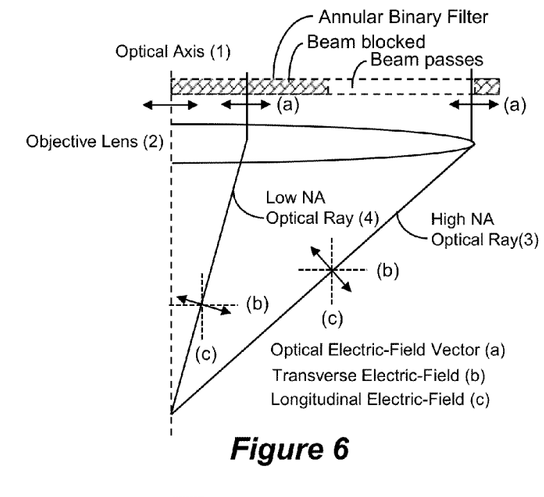
FIG. 6 illustrates transverse and longitudinal components of the focused electric-field as the optical rays extend from low-NA to high-NA.

Without being bound by theory, the operation of the disclosed embodiments for resolution enhancement will now be described with reference to FIG. 6. Under high-NA conditions, the spatial geometry of the focal plane intensity distribution is no longer circularly symmetric, but rather follows an elliptical trend, where the level of ellipticity increases as the NA also increases. This description refers to the spatial energy-density distribution of the illumination spot in the focal plane, not a polarization state. This can be explained through consideration of the electric-field vectors in the optical focal plane (a). The focal-plane electric-field distribution contains two components: a transverse/radial (b) and a longitudinal/axial (c) field. These components can be controlled (i.e. enhanced or suppressed) through careful consideration of the focusing characteristics of the imaging system. Essentially, under low-NA conditions (4) the longitudinal component in the focal-plane is negligible when compared against the transverse component; whereas, the longitudinal component becomes more dominant as the NA is increased. This longitudinal dominance can be understood through the bending of light rays as they pass through a high-NA lens (2). Immediately before the focusing lens the entire ray bundle across a plane-wave consists of purely transverse components; however, when the wave is influenced by the lens the paraxial components along the optical axis (1) remain unperturbed while the non-paraxial rays (3) are refracted towards the optical axis. This refraction (focusing) becomes stronger as one approaches the edge of the lens and therefore distorts the plane-wave to a larger degree. As a result, the field represented by this modified wavefront is now decomposed into both transverse and longitudinal components, where the magnitude of the longitudinal field component increases with increased refraction. Therefore, by controlling the polarization direction by the wave plates and the laser scan direction, one can obtain super-resolved imaging performance in one dimension as the laser interrogates a given region of interest in the specimen. In addition, the ellipticity of the focal spot distribution can be increased as well as having the focal spot area reduced through the implementation of an annular binary amplitude filter positioned before the imaging objective lens. The annular aperture will exclude/block any low-NA paraxial rays from contributing towards the resulting image and thus enable a further enhancement of the system's imaging capabilities.

Figure 7:
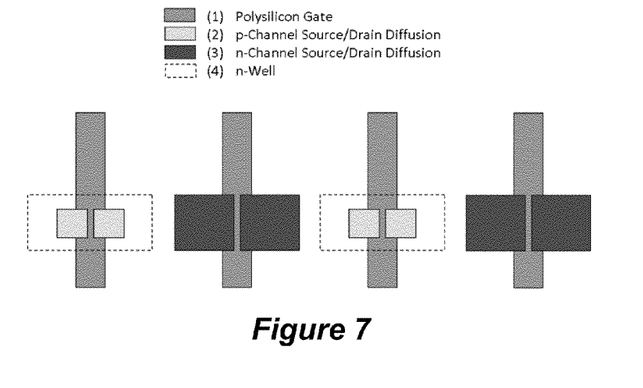
FIG. 7 is a schematic layout of an N-well CMOS inverter illustrating structural orthogonality between neighboring features.

Turning back to the microchip example, FIG. 7 illustrates a practical example, wherein it is already known that the diffusion regions (2, 3) on a device often run with their long dimension perpendicular to the long direction of overlying polysilicon gates (1). As a result, aligning an image formed using horizontally polarized light to the horizontal CAD features, and separately aligning an image formed using vertically polarized light to vertical CAD features, will together yield a more precise image-to-CAD alignment than could be achieved using just circularly polarized light, as is the current practice.

According to one embodiment, a method is disclosed wherein two separate super-resolved images are acquired, wherein one has high spatial content parallel to the scan direction and the other has high spatial content in the direction orthogonal to the first. To obtain the two images, the polarization between the two images is rotated through 90 degrees for subsequent acquisitions but the scan direction remains fixed. Through post-processing of the obtained data, a super-resolved two-dimensional image of a given region of interest can be obtained. This involves multiplexing the high resolution content from both images into one combined image through image processing. This multiplexed image is obtained by extracting the high frequency components of both images and combing them in to a single image. The super-resolved components in the images will have high spatial frequencies whereas the non super-resolved components do not.

Figure 8A:
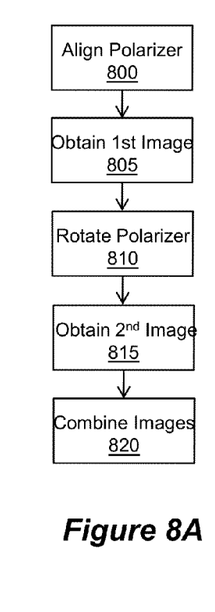
FIGS. 8A and 8B illustrate examples of processes for obtaining orthogonally polarized images.

An example of such a process is illustrated in FIG. 8A. At step 800 the polarizer is aligned. The polarizer is aligned with the direction of scanning of the illumination beam, e.g, parallel with the scanning direction. The scanning and polarization direction are also aligned with the direction of the linear direction elements within the specimen imaged. If the specimen is a microchip, then the scanning and polarization direction is aligned with the direction of the devices, e.g., transistors within the microchip. For example, the polarizer is aligned such that the linear polarization is parallel to the scan direction and to the length direction of devices, e.g., gates or diffusion regions within the area to be imaged. It should be noted that by scan direction it is better that the alignment is to the fast scan direction of the illumination beam, as illustrated in the callout of FIG. 1A.

At step 805 the beam is scanned over the area of interest and an image is obtained. The resulting image has enhanced resolution in the direction of polarization and degraded resolution in the direction perpendicular to the polarization direction. A further enhancement can be obtained by using an annular aperture that blocks the center of the beam so as to eliminate the beam from passing through the center of the objective lens, but allow the beam to pass though the area around the blocked center of the objective lens. This image can be used to align the acquired image with elements in a CAD image having length aligned with the scanning direction.

In step 810 the polarizer is rotated 90 degrees, such that the resulting polarization is orthogonal to the prior polarization. The scanning direction is maintained as in the first image, and the area of interest is scanned again in step 815 to obtain a second image. The resulting second image has enhanced resolution in a direction orthogonal to the enhanced resolution of the first image. This image can be used to align the acquired image with elements in a CAD image having length aligned perpendicular to the scanning direction. At step 820 the two images are combined, such that the resulting image has enhanced resolution in two orthogonal directions.

According to another embodiment, both orthogonally aligned polarization state images are acquire simultaneously in real-time in order to minimize the image formation time. According to one embodiment, the illumination beam is split into two separate pathways and then their electric-field vectors are pre-polarized (using suitably orientated half-wave plates in each path) to be mutually orthogonal to each other. It would then be possible to modulate the laser beams using the same repetition rate conditioning before re-combining them collinearly along the optical axis where one polarization state is intentionally delayed by half a repetition-rate cycle in order for them to strike the sample at the same rate but at different times (or different phase). For example, every other pulse or group of pulses of the laser can be alternatingly of horizontal or vertical polarization. One could then configure the acquisition software to collect and compile two sets of images separately and/or create a hybrid super-resolved image in real-time as the sample is scanned.

Figure 8B:
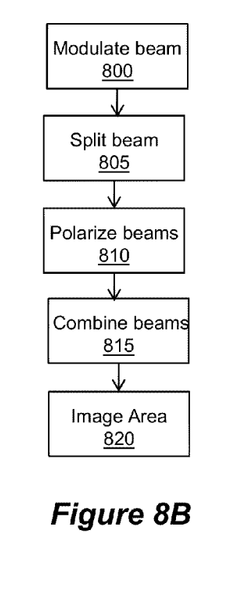

An example of a process for obtaining an image that is enhanced in two orthogonal directions simultaneously is illustrated in FIG. 8B. In this example at step 800 a laser beam is modulated at a given frequency to generate a train of laser pulses. Then, at step 805 the beam is split into two beams, e.g., the pulses are separate into two separate optical paths. At step 810 each beam is polarized in one linear direction, such that the two beams are linearly polarized in orthogonal directions. In step 815 the beams are combined so as to traverse the same optical path and at step 820 the area of interest is scanned with both beams traversing the same optical path. That is, the area of interest is scanned with a train of laser pulses, wherein each successive pulse or group of pulses is of orthogonal polarization to the one that precedes it. The reflected light is collected to generate an image having increased resolution in two orthogonal directions. To further enhance the resolution, the combined beams are passed through an annular aperture such that the central part of both beams does not pass through the objective lens.

According to another embodiment, detailed and improved CAD alignment is facilitated. This may involve aligning specific features, with improved accuracy, in either one dimension or in two dimensions—alternatively, oversampling can be used. Light whose electric-field aligns with optical features under observation yields a higher-contrast image than the case where light's electric field is polarized perpendicular to the features under observation. With the disclosed embodiments, light of an optimal polarization can be used to examine specific features on the chip, which may result in improved image resolution and/or CAD alignment.

Figure 9A:
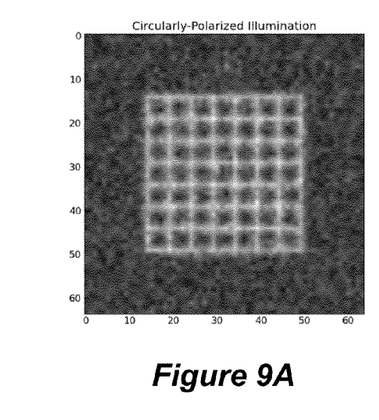
FIGS. 9A-9E illustrate examples of imaging an array of crossed wires.

The advantages of the various disclosed embodiment will now be illustrated with reference to FIGS. 9A-9E. Consider the example of imaging an array of crossed wires, as shown in FIG. 9A. What follows are simulated images of crossed wires. As a baseline example, FIG. 9A shows imaging that has the same resolution horizontally as vertically, much as would be expected from using a circularly polarized illumination source. A random source of noise has been added to this image (as well as all images that follow) to reflect noise typical of imaging electronics. Note that the resolution of both the horizontal and the vertical lines appears similar.

Figure 9B:
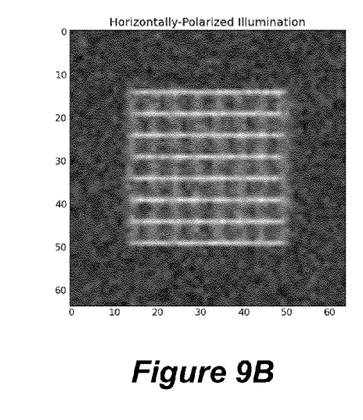

FIG. 9B shows an exaggeration of what is possible using the disclosed embodiments, in which the same structure is imaged with horizontally-polarized light under the assumption that the vertical resolution improves 40%, while the horizontal resolution worsens 40%, relative to the case of circularly polarized light shown in FIG. 9A. Note how the horizontal features in FIG. 9B are resolved more strongly than the vertical features.

Figure 9C:
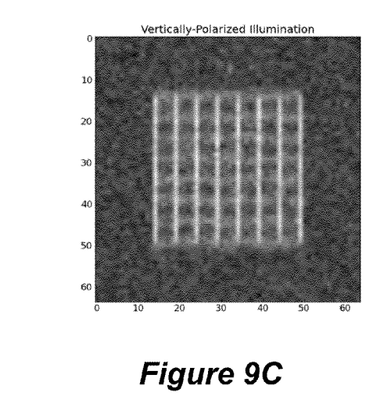

FIG. 9C shows a simulation of the same region imaged using a vertically-polarized light source, for example, as obtained by rotating the polarization of the light source as described above by 90 degrees. Note now how the vertical structures in the image are resolved more strongly than the horizontal features.

One aspect of this embodiment is the use of two images—one taken using horizontally polarized light source (for example, FIG. 9B), and the other using a vertically polarized light source (for example, FIG. 9C)—to enhance, respectively, the vertical and horizontal features in the device being imaged, and using the image with enhanced horizontal resolution to align with vertical structures in the CAD image of the same region, and using the image with enhanced vertical resolution to align with the horizontal structures in the CAD image of the same region, and by doing so obtaining an improved image-to-CAD alignment than would be possible by aligning only the image taken with circularly-polarized light to a single CAD image of the same region.

Figure 9D:
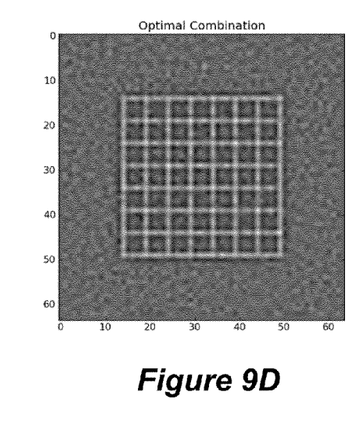

Another aspect is to use image processing of some variety to combine the best properties of images taken at crossed optical polarizations. As one example of how this could be performed, a new image can be formed using, as input, the images shown in FIGS. 9B and 9C. FIG. 9D is computed, pixel by pixel, by summing the curvature of the image from FIG. 9B taken in the vertical direction, with the curvature of the image from FIG. 9C taken in the horizontal direction, where curvature is defined as the discrete second derivative of the data. Stated more precisely, the image shown in FIG. 9D equals the image shown in FIG. 9B convolved with the horizontal Kernel $\{-1, +2, -1\}$, added to the image shown in FIG. 9C convolved with the vertical Kernel $\{-1, +2, -1\}^T$. (superscript T denotes the matrix transpose operator.) Note how this particular form of image processing, in which the enhanced horizontal resolution of FIG. 9C is combined with the enhanced vertical resolution of FIG. 9B to produce a super-resolution image, which has higher optical resolution than that obtained using circularly polarized light as shown in FIG. 9A.

It should be recognized that this particular example is just one possible way of processing two such images in order to obtain one improved image; any person skilled in the art of image processing will be able to develop similar routines that accomplish this goal.

Figure 9E:
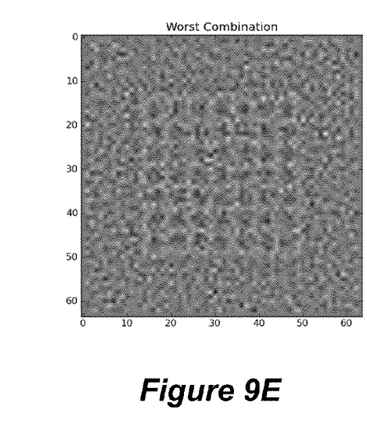

Finally, FIG. 9E shows what happens if one mistakenly reverses the image processing algorithm, such that one tries to form an image using horizontal resolution from FIG. 9B and vertical resolution from FIG. 9C. Note here that in this case neither the horizontal nor the vertical structures are well resolved.

As a second example, at the chip designer's discretion it is possible that some devices being imaged contain regions where a diffusion region runs predominantly in one direction, and other (possibly interspersed) regions where the diffusion region runs predominantly in the other direction. By weighting the horizontally polarized image more heavily in regions where the diffusion runs horizontally, and weighting the vertically polarized image more heavily in regions where the diffusion runs vertically, a better image-to-CAD alignment can be achieved.

Figure 10:
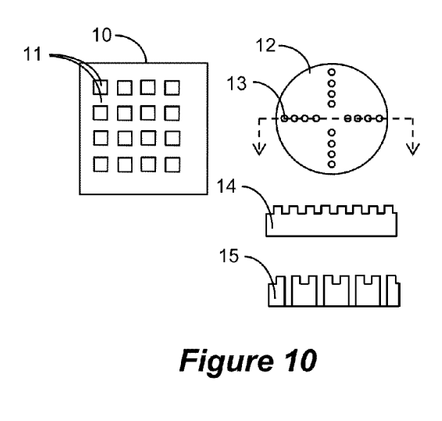
FIG. 10 illustrates examples of binary and phase shift masks.

According to further embodiment, a binary and/or phase transmission mask could be optimized or tailored to image known patterns on the object. Notably, pupil-plane engineering, along with polarization effects, can change the resultant optical spot size and shape at the object plane of the lens, and tailoring the spot shape to known device geometries could result in improved image resolution. As one example, memory devices consist of large arrays of identical structures, where each structure holds one bit of information in the memory device. FIG. 10 illustrates a cartoon of an area of a microchip having an array of repeated structures 11. Tailoring a binary amplitude, or phase transmission mask to optimally sample such memory bits will result in an improved image as compared to the current state of the art, which uses a circularly-symmetric spot size independent of the underlying structure being observed. For example, FIG. 10 illustrates a mask 12, having a plurality of apertures 13 arrange to provide a light beam that corresponds to the repeated structures 11. On the other hand, mask 14 (shown in cross-section) is a phase-shift mask designed to cause phase shift in parts of the beam to provide a light beam that corresponds to the repeated structures 11. Mask 15 is a combination binary and phase-shift mask designed to have apertures arrange to provide a light beam that corresponds to the repeated structures 11, and to cause phase shift in parts of the beam to provide a light beam that corresponds to the repeated structures 11.

To ensure clarity, abbreviations used herein relate as follows. CAD: computer aided design; InGaAs: Indium gallium arsenide; MCT: HgCdTe or mercury cadmium telluride; CCD: charge-coupled device; InSb: Indium antimonide; CMOS: Complementary metal-oxide-semiconductor; GaAs: gallium arsenide; InP: Indium phosphide; PDP: polarization differential probing.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for aligning a CAD image and an acquired image of a microchip, wherein the CAD image has horizontally aligned elements and vertically aligned elements, the method comprising:
   illuminating an area of interest in the microchip with a light beam that is linearly polarized in a first direction;
   collecting reflected light to generate a first acquired image of the microchip;
   illuminating the area of interest in the microchip with a light beam that is linearly polarized in a second direction which is perpendicular to the first direction;
   collecting reflected light to generate a second acquired image of the microchip;
   aligning the first acquired image to the horizontally aligned elements in the CAD image; and,
   aligning the second acquired image to the vertically aligned elements in the CAD image.

2. The method of claim 1, wherein the first acquired image and the second acquired image are generated successively.

3. The method of claim 1, wherein the first acquired image and the second acquired image are generated simultaneously.

4. The method of claim 1, wherein the light beam comprises a laser light beam.

5. The method of claim 4, wherein the step of illuminating the area of interest comprises scanning the laser light beam.

6. The method of claim 1, wherein the steps of illuminating an area of interest in the microchip with a light beam that is linearly polarized in a first direction and illuminating the area of interest in the microchip with a light beam that is linearly polarized in a second direction is performed by linearly polarizing a light beam and thereafter rotating the linearly polarized light beam by 45 degrees.

7. The method of claim 1, wherein the steps of illuminating an area of interest in the microchip with a light beam that is linearly polarized in a first direction and illuminating the area of interest in the microchip with a light beam that is linearly polarized in a second direction is performed by alternatingly directing a light beam onto two alternate optical paths, wherein each of the optical paths comprises a linear polarizer that is oriented orthogonally to the linear polarizer in the other path.

8. The method of claim 1, wherein the steps of illuminating an area of interest in the microchip with a light beam that is linearly polarized in a first direction and illuminating the area of interest in the microchip with a light beam that is linearly polarized in a second direction is performed by splitting a light beam onto two optical paths, wherein each of the optical paths comprises a linear polarizer that is oriented orthogonally to the linear polarizer in the other path.

9. The method of claim 1, further comprising excluding low numerical aperture paraxial rays from contributing towards the first and second acquired images.

10. The method of claim 1, further comprising placing a mask in the optical path of the light beam.

11. The method of claim 10, wherein the mask comprises a binary mask or a phase-shift mask.

12. The method of claim 1, further comprising generating a combined image by combining high frequency components in the first acquired image and high frequency components in the second acquired image.

13. The method of claim 1, further comprising generating a combined image by summing curvature of the first acquired image and curvature of the second acquired image, where curvature is defined as the discrete second derivative of data in the first acquired image and the second acquired image.

14. A system for aligning a CAD image and an acquired image of a microchip, wherein the CAD image has horizontally aligned elements and vertically aligned elements, comprising:
- an illumination source providing a light beam traversing an optical path leading to the microchip;
- a linear polarization arrangement in the optical path and operable to generate a horizontally polarized beam or a vertically polarized beam;
- a high numerical aperture lens arrangement in the optical path;
- an imager operable to generate a first image from light reflected from the microchip when illuminated with the horizontally polarized beam and generate a second image from light reflected from the microchip when illuminated with the vertically polarized beam;
- a computer operable to fetch the CAD image and overlay the first image and the CAD image and overlay the second image and the CAD image, to thereby align the first image to the horizontally aligned elements in the CAD image, and align the second image to the vertically aligned elements in the CAD image.

15. The system of claim 14, wherein the light source is selected from laser, LED, and superluminescent diode.

16. The system of claim 15, wherein the imager is selected from infrared sensors of the types: InGaAs, MCT, CCD, InSb, CMOS, GaAs, InP.

17. The system of claim 14, further comprising laser scanning microscope in the optical path.

18. The system of claim 14, further comprising an annular binary aperture in the optical path.

19. The system of claim 14, wherein the high numerical aperture lens arrangement comprises an objective lens and a solid immersion lens.

20. The system of claim 14, wherein the linear polarization arrangement comprises polarization differential probing.

* * * * *